(12) United States Patent  (10) Patent No.: US 7,047,904 B2
Smith  (45) Date of Patent: May 23, 2006

(54) EGG HARVESTER

(75) Inventor: Colin James Smith, Beerwah (AU)

(73) Assignee: Christine Anne Smith, Queensland (AU), part interest ( * ) Notice: Subject to any disclaimer, the term of this patent is extended or adjusted under 35 U.S.C. 154(b) by 0 days.

(21) Appl. No.: 10/477,786

(22) PCT Filed: May 17, 2002

(86) PCT No.: PCT/AU02/00610

§ 371 (c)(1),
(2), (4) Date: Nov. 13, 2003

(87) PCT Pub. No.: WO02/091819

PCT Pub. Date: Nov. 21, 2002

(65) Prior Publication Data

US 2004/0144326 A1    Jul. 29, 2004

(30) Foreign Application Priority Data

May 17, 2001    (AU) .................................... PR5106

(51) Int. Cl.
*A01K 31/16*    (2006.01)

(52) U.S. Cl. ........................ 119/337; 119/338; 119/440
(58) Field of Classification Search ................ 119/337, 119/6.8, 338, 336, 335, 334, 342, 343, 327, 119/439, 440, 442
See application file for complete search history.

(56) References Cited

U.S. PATENT DOCUMENTS

| 2,745,379 | A | * | 5/1956  | Schmidt ...................... 119/337 |
| 2,886,173 | A | * | 5/1959  | Scott ........................... 209/516 |
| 3,109,413 | A | * | 11/1963 | Patchett ...................... 119/337 |
| 3,306,259 | A | * | 2/1967  | Willauer, Jr. ................ 119/337 |
| 3,672,485 | A | * | 6/1972  | Walters ...................... 198/450 |
| 3,721,214 | A | * | 3/1973  | Staples et al. ............. 119/442 |
| 3,789,802 | A | * | 2/1974  | Conley ....................... 119/337 |
| 4,159,696 | A | * | 7/1979  | Martin ........................ 119/337 |
| 4,416,219 | A | * | 11/1983 | Dill ............................. 119/337 |
| 5,174,242 | A | * | 12/1992 | Takeuchi .................... 119/439 |
| 5,279,254 | A | * | 1/1994  | Dowty ....................... 119/337 |
| 5,562,067 | A |   | 10/1996 | Smith |
| 5,673,649 | A | * | 10/1997 | Duecker et al. ............ 119/337 |

FOREIGN PATENT DOCUMENTS

| EP | 079663 B1 |   | 2/1986 |
| FR | 2730903 A1 | * | 8/1996 |
| FR | 2759542 A1 | * | 8/1998 |
| JP | 06153735 A | * | 6/1994 |
| SU | 1007619 A |   | 3/1983 |

* cited by examiner

*Primary Examiner*—Son T. Nguyen
(74) *Attorney, Agent, or Firm*—William H. Eilberg

(57) ABSTRACT

An egg harvester (100) has a shuttle (101) where a top run (32) of a conveyor (30) defines horizontal slots (40, 90) to receive eggs from a mat (10) on which eggs are laid. Damaged eggs and litter are separated on a transfer conveyor (60), and the sound eggs are transferred to an egg belt by a transverse conveyor (68). Fresh litter can be laid on the mat (10) as the shuttle (101) advances under the birds (50) in the nests (51).

14 Claims, 5 Drawing Sheets

EGG HARVESTER

BACKGROUND OF THE INVENTION

1. Field of the Invention

THIS INVENTION relates to an egg harvester.

2. Prior Art

The egg harvester, by the present applicants, disclosed in International Publication WO 92/20222 (=AU-B-17690/92/(659642)/=EP 0591468 B1/=U.S. Pat. No. 5,562,067) was a major advance on existing commercial egg harvesters available at the beginning of the 1990's.

There were three important concepts relevant to the design of the egg harvester of WO 92/20222. These were as follows:

a) the hens were to be disturbed as little as possible, while on their nests, as the eggs are harvested;

b) the hens were to be provided with individual nesting boxes for privacy while they were laying; and c) the nesting boxes were to be provided with litter flooring.

While the egg harvester of WO 92/20222 was a considerable advance over the existing commercial egg harvesters, as stated above, the design criteria resulted in two practical limitations.

Firstly, to minimise disturbance to the hens as the eggs were collected, the intermediate floor section, mounted on the shuttle or carriage which moved along the harvester, was arranged substantially co-planar with the adjacent ramp sections of the belt forming the floor of the nesting boxes, so that the slots through which the eggs fell were substantially vertical, ie., as the slots were advanced along the floor of the nesting boxes, the eggs (72) and litter (73) fell through the slots (70) and the eggs were separated from the litter by an egg separator (74), in which a plurality of radial fingers (75) were provided on a shaft (76) journalled transversely to the shaft frame. Fixed fingers (77) provided between every second pair of radial fingers (75) guided the eggs (72) onto an inclined tray (78), which transferred the eggs to a shuttle egg conveyor (79). In practice, it was found that the eggs were liable to be damaged when two eggs fell together onto the egg separator (74).

Secondly, the provision of individual nesting boxes for each hen proved inefficient use of the floor space occupied by the egg harvester. Furthermore, the inventor has observed that the hens are happier when they are allowed to lay their eggs in small groups, eg., of 6–12 hens.

SUMMARY OF THE PRESENT INVENTION

It is an object of the present invention to provide an egg harvester where the orientation of the slot(s) through which the eggs (and litter) is/are passed for separation is arranged to minimise damage to the eggs.

It is a preferred object of the present invention to provide an egg harvester where the orientation of the slot(s) is/are arranged to cause the hens to be at least momentarily disturbed, ie., to cause the hens to stand up as the slots pass under the nesting boxes.

It is a further preferred object of the present invention to provide a harvester where the nesting boxes are arranged for more efficient use of the nest floor area occupied by the birds.

It is a further preferred object of the present invention to provide a harvester nest system which can be raised or lowered to assist in the training of young hens to use the harvester.

It is a further preferred object of the present invention to provide a harvester which enables improved shed management.

Other preferred objects of the present invention will become apparent from the following description.

In one aspect, the present invention resides in an egg harvester for collecting eggs of laying hens or the like, including:

an elongate hen-laying zone, having a plurality of hen-laying stations or nests along the zone;

a flexible mat, belt or band, extending along the zone forming the floor for the laying stations or nests;

a shuttle or carriage movable along the zone;

roller, drum, disc or bar means on the shuttle or carriage, engageable with the mat to selectively reflect or guide a portion of the mat, as the shuttle or carriage advances, below the level of adjacent portions of the mat;

an intermediate floor section, having a belt or band, on the shuttle or carriage, with respective end portions of the intermediate floor section spaced at a level above the adjacent portions of the mat, the respective end portions of the intermediate floor section and the adjacent portions of the mat forming respective, substantially horizontal, slots which advance transversely to the hen-laying stations or nests, as the shuttle or carriage is advanced;

so arranged that:

any litter and/or eggs on the mat pass through the leading one of the slots for collection of eggs and/or cleaning of litter as the shuttle or carriage is advanced.

Preferably, cleaned and/or fresh litter is placed on a downstream portion of the mat to enable the litter to pass through the trailing one of the slots, as the shuttle or carriage is advanced, to replace the litter in the laying-stations or nests.

Preferably, hens nesting on the mat are raised from the litter and/or eggs on the mat onto the intermediate floor section as the shuttle or carriage passes beneath the respective laying stations or nests which the hens occupy.

Preferably, the top deck or run of the belt or band of the intermediate floor station is timed to match the ground speed of the shuttle.

Preferably, the surface of the belt or band is variegated (or uneven) to encourage the hens to step onto the mat.

Preferably, the litter and/or eggs entering the leading one of the slots is transferred from the mat to a transfer conveyor on the shuttle or carriage, which is preferably of the spaced rod type to enable the clean litter to fall through the conveyor for collection, the litter being preferably returned to the mat to be passed through the trailing one of the slots.

Preferably, a pair of convergent guides are provided above the transfer conveyor, where the lower edges of the guide are spaced preferably a distance not less than one-half of the diameter of typical eggs being laid by the hens, so that broken eggs/manure/dirty litter can pass under and fall onto a transverse waste conveyor or scraper for discharge.

Preferably, the sound eggs (for collection) are directed to a transverse egg collection conveyor.

Preferably, the sound eggs are expelled from the rod conveyor to the (transverse) egg conveyor by a finger wheel, which propels the eggs through a damper curtain.

Preferably, the eggs from the egg conveyor are deposited onto an egg belt extending parallel to the elongate zone.

Preferably, the harvester is mounted on a frame having adjustable height legs to enable the harvester to be raised or lowered, relative to the laying shed floor to enable young hens to be trained to enter the laying stations or nests.

Preferably, each of the laying stations are arranged with pairs of colony nests (eg., for 1–25 hens) across the mat, and adjacent laying stations are hingedly interconnected to be raised or lowered relative to the mat as the shuttle or carriage advances.

Preferably, each laying station or nest has an end wall interconnected by a pair of side walls, each side wall having a pair of side wall portions with one side wall portion hingedly connected to the other side wall portion and to the end wall.

Preferably, a divider curtain extends along the centre line of the zone to divide each laying station into a pair of colony nests.

BRIEF DESCRIPTION OF THE DRAWINGS

To enable the invention to be fully understood, a preferred embodiment will now be described with reference to the accompanying drawings in which.

DETAILED DESCRIPTION OF THE PREFERRED EMBODIMENTS

Figure 1:
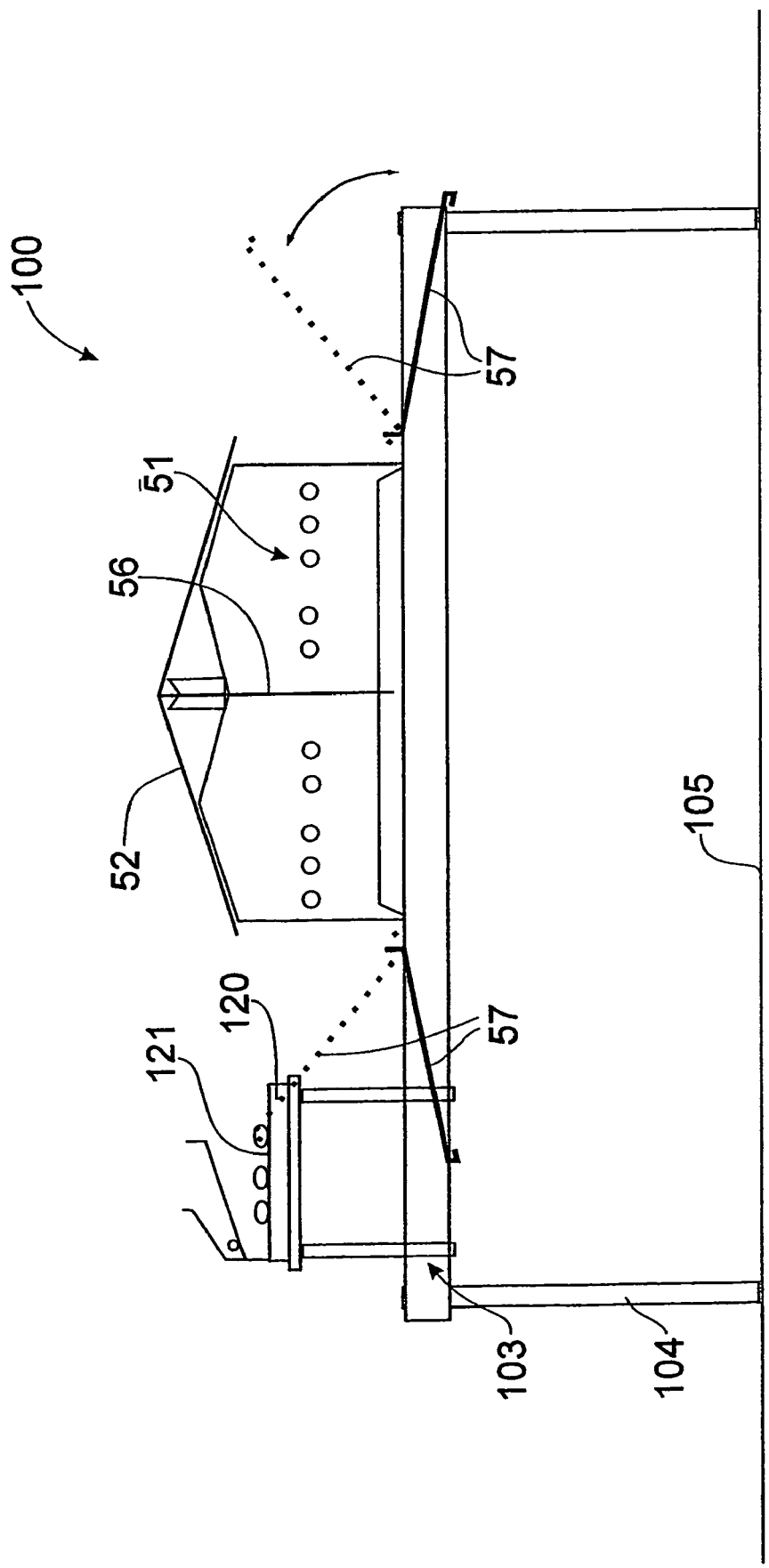
FIG. 1 is a schematic end view of the egg harvester.

Referring to FIG. 1, the egg harvester 100 is designed for a colony or community-style nest system, and is most commonly installed as a single, standalone system down the centre of the shed. In exceptionally wide sheds, a second harvester may be provided.

Figure 2:
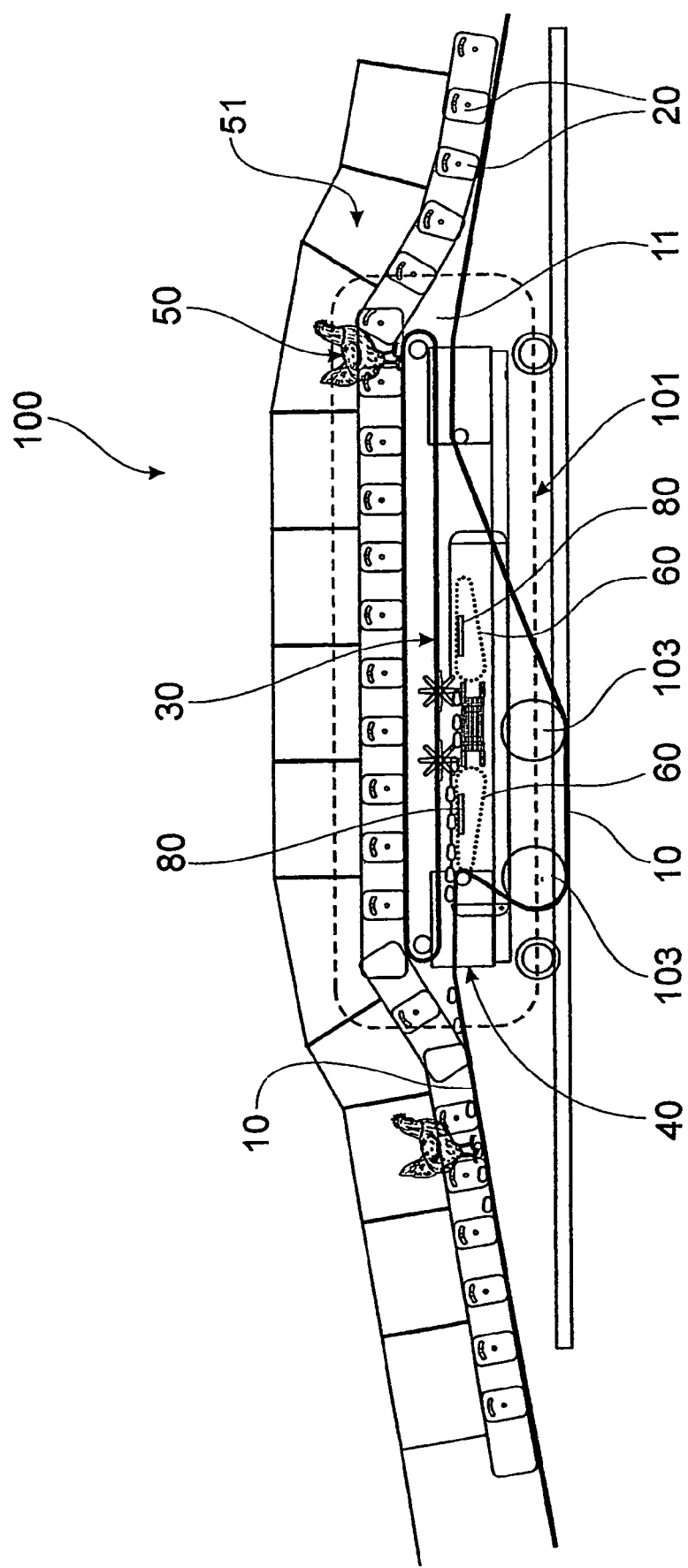
FIG. 2 is a schematic side view of a portion of the egg harvester showing the shuttle or carriage.
Figure 3:
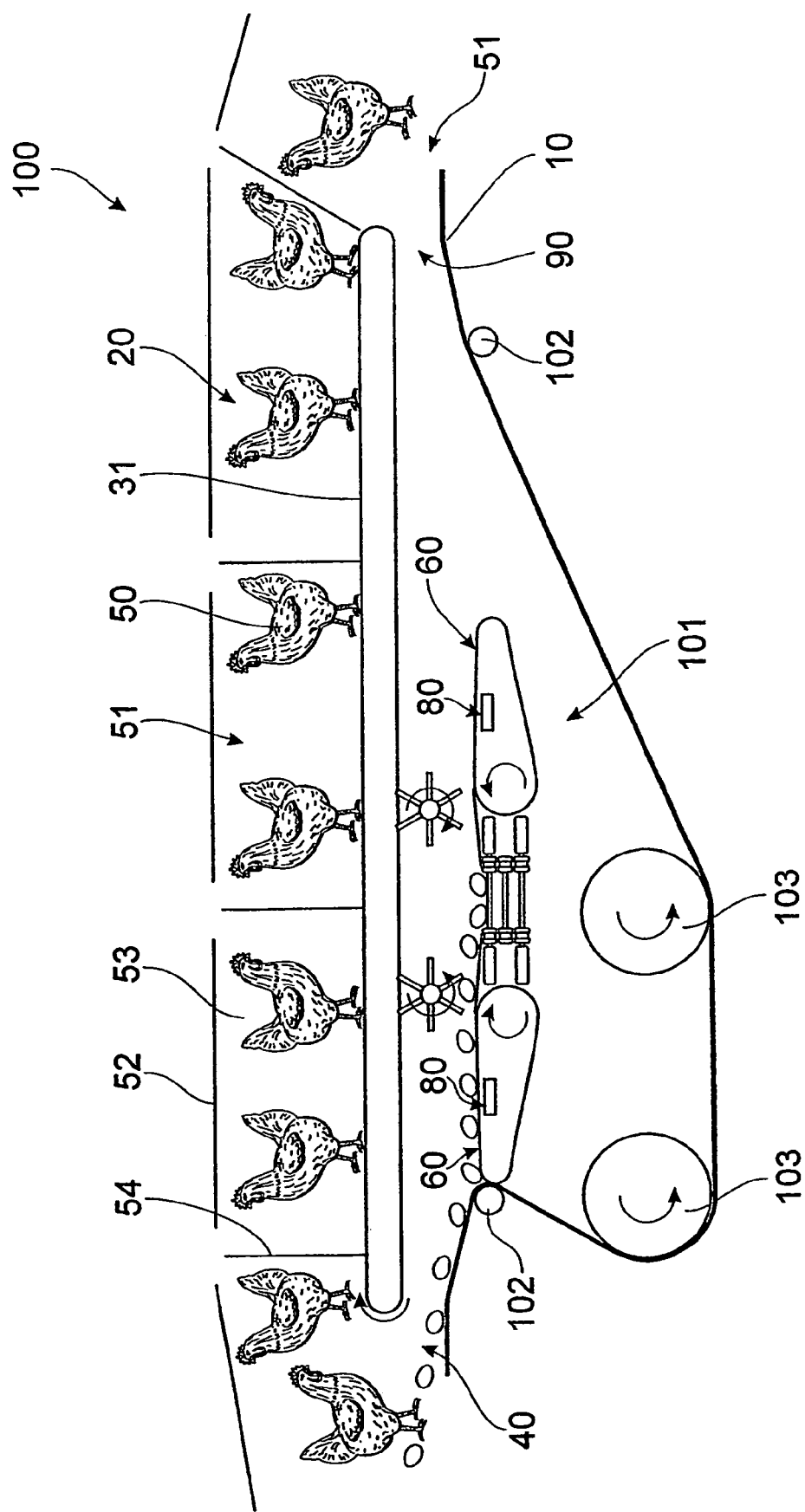
FIG. 3 is an enlarged view of the portion shown in dashed lines in FIG. 2.
Figure 4:
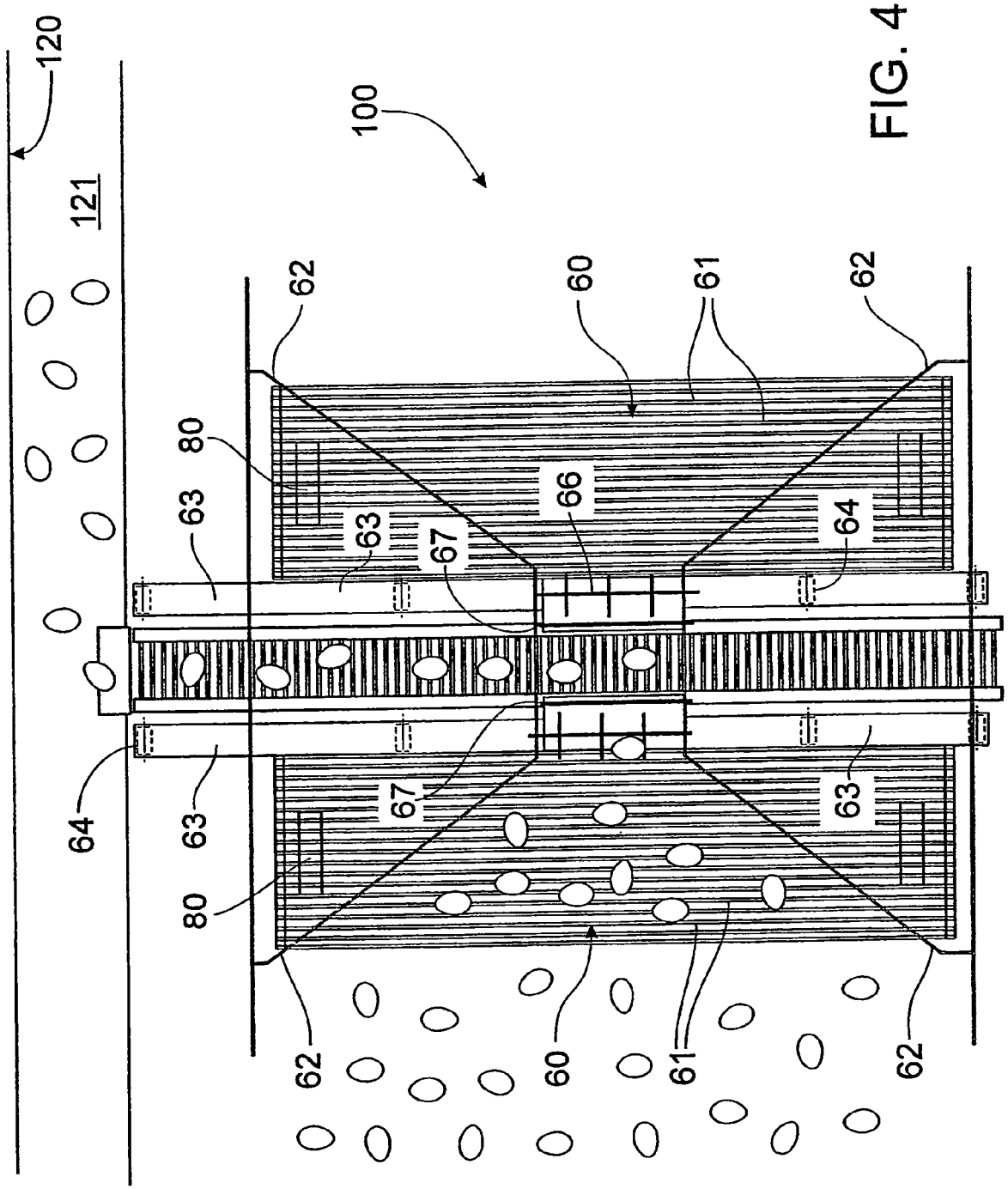
FIG. 4 is a schematic plan view, corresponding to FIG. 3, the intermediate floor section being omitted for clarity.

Referring to FIGS. 2, 3 and 4, the harvester 100 has a shuttle unit generally indicated 101 which travels along the egg-laying zone in association with an elongated mat 10 fixed at each end, on which rests the hinged connecting nest boxes 20 to be hereinafter described. The mat 10, and a top deck 31 of a second conveyor, which forms the intermediate floor section 30, on the shuttle 101, define two substantially horizontal slots 40, 90 that pass (transversely) under and elevate the nesting boxes 20 and any birds 50 therein.

The leading slot 40 allows the eggs E and litter L to pass horizontally into the shuttle 101.

The rotation of the top deck 31 of the intermediate floor section 30 is timed to match the ground speed of the shuttle 101 and gently raises the birds 50 from the nest litter L and eggs E, assisted by a variegated-type conveyor surface. It will be noted in FIG. 3 that the birds are retained in a nest 51, on top of this conveyor surface, by the nest roof 52 and the side panels 53 of the nest 51, above the shuttle.

The nest contents (eggs and litter) conveyed within the harvester on a transfer conveyor 60 (having spaced rods 61) (see FIG. 4) that allows clean litter L to fall through to a location 70 where it can be re-laid on the mat 10 and returned to the nests 51.

Rattlers 80, being ribbed plastic pads, that the rods 61 of the rod-conveyor 60 ride on, enhance the cleaning action separating the litter L from the eggs E.

Remaining dirty litter and broken eggs are separated from the sound eggs by compressing and passing underneath a pair of raised angle adjustable height blades 62. As shown in FIG. 4, each rod conveyor 60 is provided with a pair of the height blades 62 which are convergent to guide the sound eggs to be graded, as hereinafter described.

The lower faces of the height blades 62 are spaced above the rod conveyors 60 by a distance approximately one-half the diameter of the sound eggs, so that the sound eggs are directed to the grading apparatus, but the broken eggs/manure/dirty litter can pass onto a tray 63 and be wiped onto the floor by a scraper 64 attached to the egg conveyor.

The sound eggs are graded to the centre section 65 of the rod conveyors 60 by the height blades 62. At the centre section 65, they are propelled by a finger wheel 66, through a damper curtain 67 and onto a transverse egg conveyor 68 for delivery from the shuttle to an egg belt 121 in the egg trunking 120 which extends parallel to the egg harvester 100—see FIGS. 1 and 4.

By use of this arrangement, the sound eggs remain in a controlled motion at all times and the opportunity for cracking is eliminated—the nest contents (minus the bird) pass horizontally through the leading slot 40 and onto the rods 61 of the rod conveyor 60 to allow the litter to sift away—still without risk to the egg.

The second (or trailing) slot 90 allows the clean nest litter to return back to the nest 51 and under the nesting birds 50.

Preferably, the top deck 31 is hinged to allow easy access into the shuttle 101 for servicing, and gas struts may be provided to assist the lifting.

The shuttle 101 includes a pair of spaced discs (or rollers) 102, 103 to configure the mat 10 as it passes through the shuttle 101. The discs or rollers 102, 103 are spring-loaded to compensate the thermal expansion and contraction of the nest mat 10 and to maintain correct tension.

The shuttle 101 is self-propelled by a trailing lead and a special compartment on top of the egg trunking 120. The shuttle 101 runs the entire length of the zone or nest bed at pre-programmed settings. The internal module of the shuttle is oriented at the end of each run by an electric motor in preparation for the next direction run in the opposite direction. Preferably, the entire shuttle is controlled by a PLC within the control enclosure and includes electric drive gear motors and sensors for monitoring all functions.

The egg belt 121 is enclosed in a galvanised steel egg trunking 120 with a polypropylene curtain on the front. The eggs are continually placed on this belt by the shuttle 101 and stored ready for packing by the operators. The trunking assembly 120 ensures that the eggs on the belt 121 are protected from dust and moisture and away from any birds that would eat them.

The collection table is positioned outside the bird area at a convenient height for the operator. It provides a large work area and storage for eggs and fillers.

The conveyor belt 121 is infinitely variable by a remote hand control to maximise labour efficiency and minimise the risk of cracked eggs.

Figure 5:
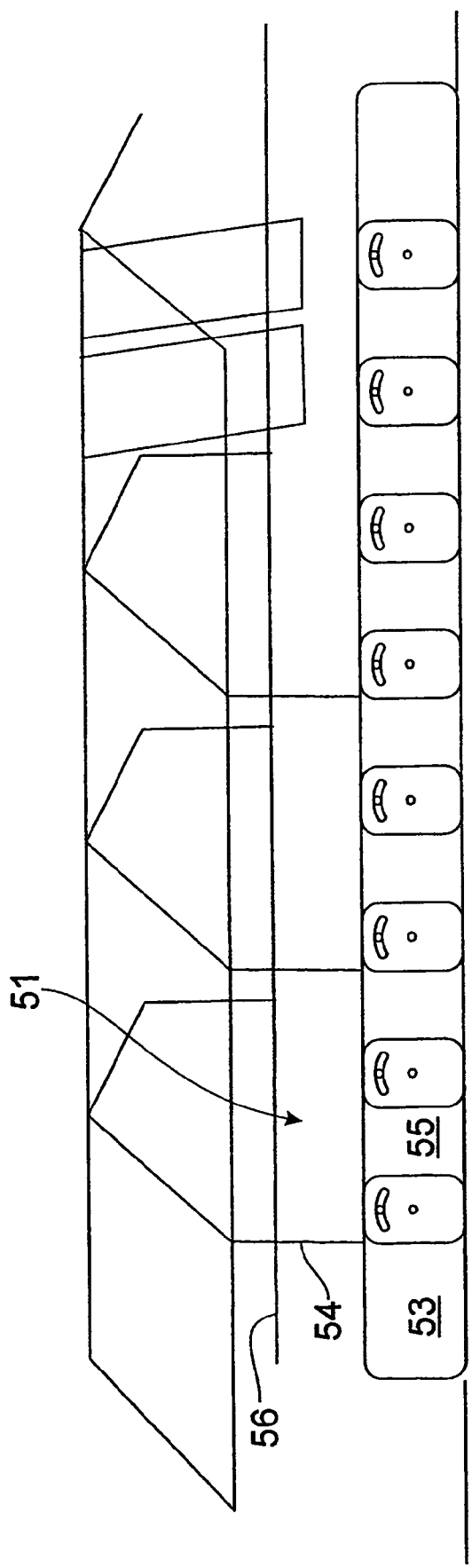
FIG. 5 is a schematic side view of the nesting boxes for the laying stations.

As shown in FIG. 5, the colony type nests 51 are formed by laying stations which extend across the mat 10 and which have a fixed end wall 54 and a pair of side wall portions 53 and a pair of extensions 55. The side wall portions 53 are attached to the fixed end wall 54 and hingedly connected to the extensions 55, while the extensions 55 are hingedly connected at their distal ends to the adjacent nesting box 51.

As shown in FIGS. 1 and 5, a nest divider curtain 56 is hung along the centre line of the zone from the nest ceiling.

Side wall portions 53 are of reduced height for easier entry or exit from the nest by the birds. The side wall portions 53 are folded at right angles to the main body during assembly and are then hingedly attached to the extensions 55.

The entire length of the nest box area is embraced by a cable on each side secured to every nest by split pins.

It will be readily apparent to the skilled addressee that other methods of hingedly connecting the laying station together may include slots and tabs, accordion-type folds, or indirect connection by cables and clips.

The larger colony-type nests which may contain up to 25 birds are more attractive to the birds as it is more suitable to their biological nesting habits. The greater nest area allows a greater density of birds to nest in a given nest area. The birds can comfortably "jigsaw" together, and in the embodiments shown, the nesting area is up to 20% greater than other imported colony nest systems. (With the small individual nests of the egg harvester of WO 92/20222, there was up to 40% wasted space around each bird to the wall and corners in a nest.)

The large open nests 51 allow greater air flow and are thus cooler, which is important in hot climates, and the nesting boxes 51 are easy and cost-effective to install and are also easy to clean between flocks or batches.

Preferably, the nests 51 are injection-moulded from improved quality polypropylene for long life and easy cleaning.

The divider curtain 56 provides an enclosed environment to encourage the birds 50 into the nest 51, but will push aside to allow freedom of movement for the birds when required.

Referring to FIG. 1, preferably the perch and walkways 57 are constructed of galvanised wire which aids in cleaning the birds 50 as they enter the nest and allow good light penetration under the nest bed to minimise floor eggs. The walkways 57 are hinged to allow them to be folded up for easier access to the nests and the whole system is light and flexible to enable it to be raised to make it easier to clean out the shed between the flocks.

The egg harvester 100 is mounted on a frame 103 on legs 104 of adjustable height. This is an advantage when training a young flock to lay in a nest, as the harvester 101 can be lowered to just above the shed floor 105. The nest can be lifted to any desired height without correcting the operation of the shuttle 101 which can operate at any height setting.

At the end of each flock, the system can be lifted on the optional high lift legs 104 to allow machinery to clean underneath. Alternatively, the system can be winched up for cleaning.

Preferably, the legs 104 are individually adjustable to allow the system to be installed on dirt, or uneven, floors.

The roof is of the light gable apex-style covered and installed directly above the nest boxes and can perform several functions:

1. It provides a darker nest environment to encourage birds in the nest.

2. It keeps moisture out of the nests in sheds that are installed with internal cooling fogger systems. The edges of the roof are also extended wide enough to provide a drip line that is clear of the nests.

3. The birds are retained in the nests as the shuttle collects beneath them by design of the nest roof that forms a seal as the nest is raised underneath. This is important as a bird that is at the point of laying an egg may try to leave the nest and the egg will be laid on the floor.

4. The nest roof is installed on a simple winch system (not shown) which allows it to be easily raised—this is very useful when servicing the nest or topping up the nest litter levels. (It is an enormous advantage to be able to raise the roof during times of extreme heat—this enables immediate air flow to assist in keeping the birds comfortable and is a feature not available in any other nesting systems.

5. When raising the roof at cleanout time between flocks, the nests can be connected by the provided attachments and also raised and suspended between the nest roof and the nest beds. This allows easy cleaning.

It will be readily apparent to the skilled addressee that the present invention provides advantages over the harvester disclosed in WO 92/20222 and, in particular, in a reduction of cracked eggs during collection.

Various changes and modifications may be made to the embodiments described and illustrated without departing from the present invention.

The invention claimed is:

1. An egg harvester for collecting eggs of laying hens including:
    an elongate hen-laying zone, having a plurality of hen-laying stations or nests along the zone;
    a flexible belt or band, extending along the zone forming the floor for the laying stations or nests;
    a shuttle or carriage movable along the zone,
    roller, drum, or disc means on the shuttle or carriage, engageable with the belt or band to selectively deflect or guide a portion of the belt or band, as the shuttle or carriage advances, below the level of adjacent portions of the belt or band;
    an intermediate floor section, on the shuttle or carriage, the intermediate floor section having a longitudinal axis, with respective end portions of the intermediate floor section spaced a vertical distance above adjacent portions of the belt or band, the respective end portions of the intermediate floor section and adjacent portions of the belt or band forming respective, substantially horizontally-directed, slots which advance to the hen-laying stations or nests, as the shuttle or carriage is advanced, wherein the slots are generally parallel to the longitudinal axis of the intermediate floor section;
    so arranged that:
    any litter and/or eggs on the belt or band pass through the leading one of the slots for collection of eggs and/or cleaning of litter as the shuttle or carriage is advanced.

2. An egg harvester as claimed in claim 1, wherein:
    cleaned and/or fresh litter is placed on a downstream portion of the belt or band to enable the litter to pass through the trailing one of the slots, as the shuttle or carriage is advanced, to replace the litter in the laying stations or nests.

3. An egg harvester as claimed in claim 1, wherein:
    hens nesting on the belt or band are raised from the litter and/or eggs on the belt or band onto the intermediate floor section as the shuttle or carriage passes beneath the respective laying stations or nests which the hens occupy.

4. An egg harvester as claimed in claim 1, wherein:
    the intermediate floor section has a top deck or run, and wherein the top deck or run of the intermediate floor section is timed to match the speed of the shuttle relative to the flexible belt or band.

5. An egg harvester as claimed in claim 1, wherein:
    the surface of the intermediate floor section is variegated or uneven, to encourage the hens to stop onto the belt or band.

6. An egg harvester as claimed in claim 1, wherein:
    the litter and/or eggs entering the leading one of the slots is transferred from the belt or band to a transfer conveyor on the shuttle or carriage, which is of the spaced-rod type to enable the clean litter to fall through the transfer conveyor for collection, the litter being returned to the belt or band to be passed through the trailing one of the slots.

7. An egg harvester as claimed in claim 6, wherein:
a pair of convergent guides are provided above the transfer conveyor, where the lower edges of the guide are spaced a distance not less than one-half of the diameter of typical eggs being laid by the hens, so that broken eggs/manure/dirty litter can pass under and fall onto a transverse waste conveyor or scraper for discharge.

8. An egg harvester as claimed in claim 7, wherein:
sound eggs, for collection, are directed to a transverse egg collection conveyor.

9. An egg harvester as claimed in claim 8, wherein:
the sound eggs are expelled from the transfer conveyor to the transverse egg conveyor by a finger wheel, which propels the eggs through a damper curtain.

10. An egg harvester as claimed in claim 9, wherein:
the eggs from the egg conveyor are deposited onto an egg belt extending parallel to the elongate zone.

11. An egg harvester as claimed in claim 1, wherein:
the harvester is mounted on a frame having adjustable height legs to enable the harvester to be raised or lowered, relative to the laying shed floor to enable young hens to be rained to enter laying stations or nests.

12. An egg harvester as claimed in claim 11, wherein:
each of the laying stations are arranged with pairs of colony nests, for multiple hens, across the belt or band, and adjacent laying stations are hingedly interconnected to be raised or lowered relative to the belt or band as the shuttle or carriage advances.

13. An egg harvester as claimed in claim 12, wherein:
each laying station or nest has an end wall interconnected by a pair of side walls, each side wall having a pair of side wall portions with one side wall portion hingedly connected to the other side wall portion and to the end wall.

14. An egg harvester as claimed in claim 12, wherein:
a divider curtain extends along the centre line of the zone to divide each laying station into a pair of colony nests.

* * * * *